United States Patent [19]

Weelink

[11] Patent Number: 5,111,770
[45] Date of Patent: May 12, 1992

[54] CUBICLE PARTITION

[76] Inventor: Johannes M. W. Weelink, No. 58, Tynaarlosestraat, NL-9481 AD Vries, Netherlands

[21] Appl. No.: 640,880

[22] Filed: Jan. 14, 1991

[30] Foreign Application Priority Data

Jan. 19, 1990 [NL] Netherlands .................. 9000142

[51] Int. Cl.[5] ............................................. A01K 5/00
[52] U.S. Cl. ...................... 119/27; 403/390; 119/11
[58] Field of Search ............... 119/11, 27, 28; 403/390, 391, 400

[56] References Cited

U.S. PATENT DOCUMENTS

| | | | |
|---|---|---|---|
| 2,164,022 | 6/1939 | Rowe | 403/390 X |
| 2,888,722 | 6/1959 | Jenne | 403/390 X |
| 3,415,554 | 12/1968 | Papoyoti | 403/400 X |
| 3,734,439 | 5/1973 | Wintz | 248/224.1 |
| 4,171,684 | 10/1979 | Herr et al. | 119/27 |
| 4,241,699 | 12/1980 | Orchard | 119/27 X |
| 4,350,117 | 9/1982 | Hacker | 119/27 |
| 4,407,601 | 10/1983 | Reeder | 403/390 X |
| 4,597,140 | 7/1986 | Girard | 403/391 X |

FOREIGN PATENT DOCUMENTS

| | | | |
|---|---|---|---|
| 769848 | 10/1967 | Canada | 403/390 |
| 57490 | 8/1982 | European Pat. Off. | 119/27 |
| 90470 | 10/1983 | European Pat. Off. | 119/27 |
| 2492629 | 4/1982 | France | |
| 8300919 | 10/1983 | Netherlands | 119/27 |
| 2094125 | 9/1982 | United Kingdom | 119/27 |

*Primary Examiner*—Gene Mancene
*Assistant Examiner*—Thomas Price
*Attorney, Agent, or Firm*—Wegner, Cantor, Mueller & Player

[57] ABSTRACT

The invention relates to a cubicle partition comprising at least one standing pipe and, connected thereto, a bracket-shaped rail bent from tube material, wherein a mounting plate is fixed to the bottom end of the standing pipe. The standing pipe comprises a reinforcing foot which extends diverging downward from a distance above the bottom end.

20 Claims, 4 Drawing Sheets

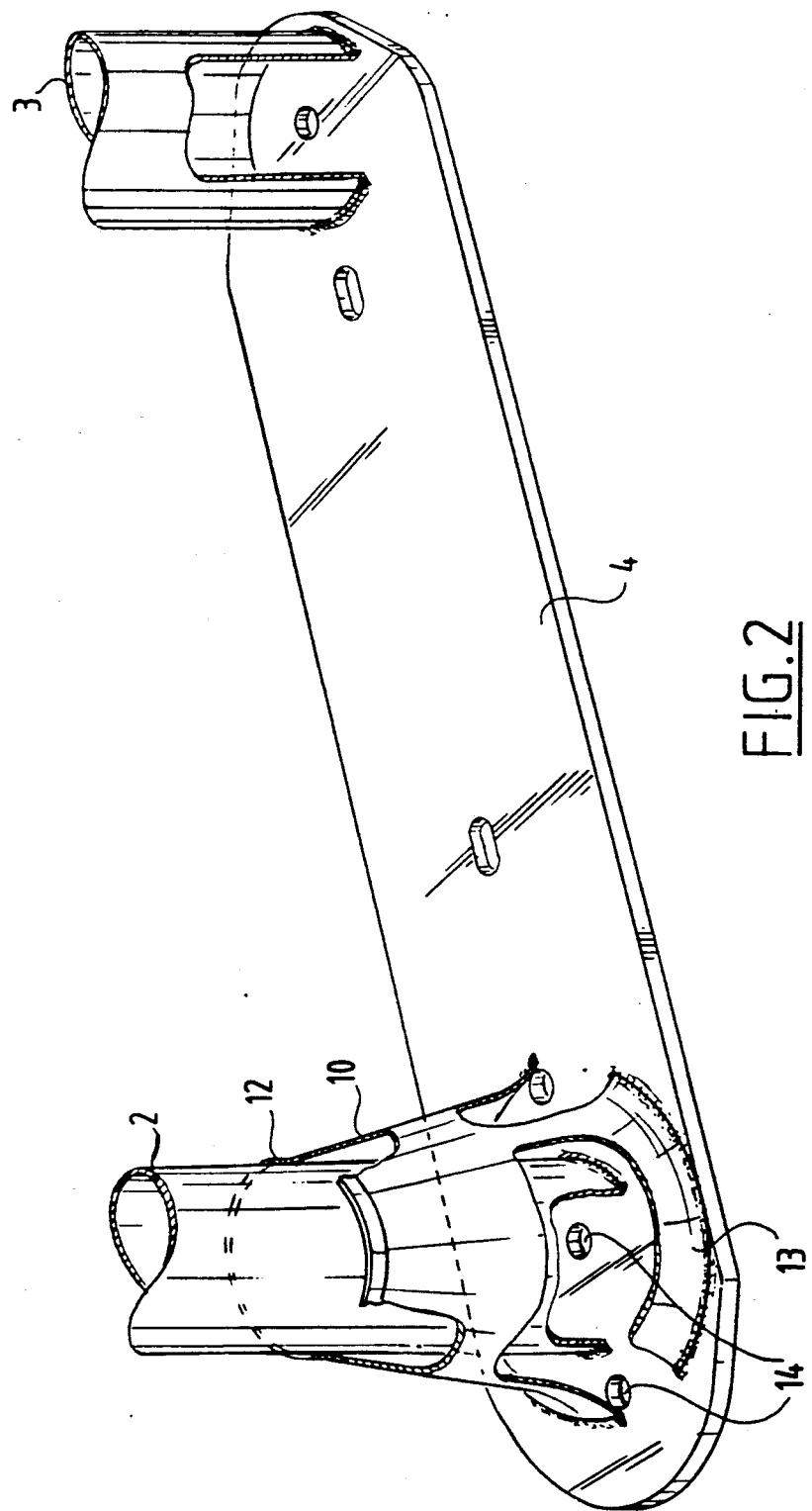

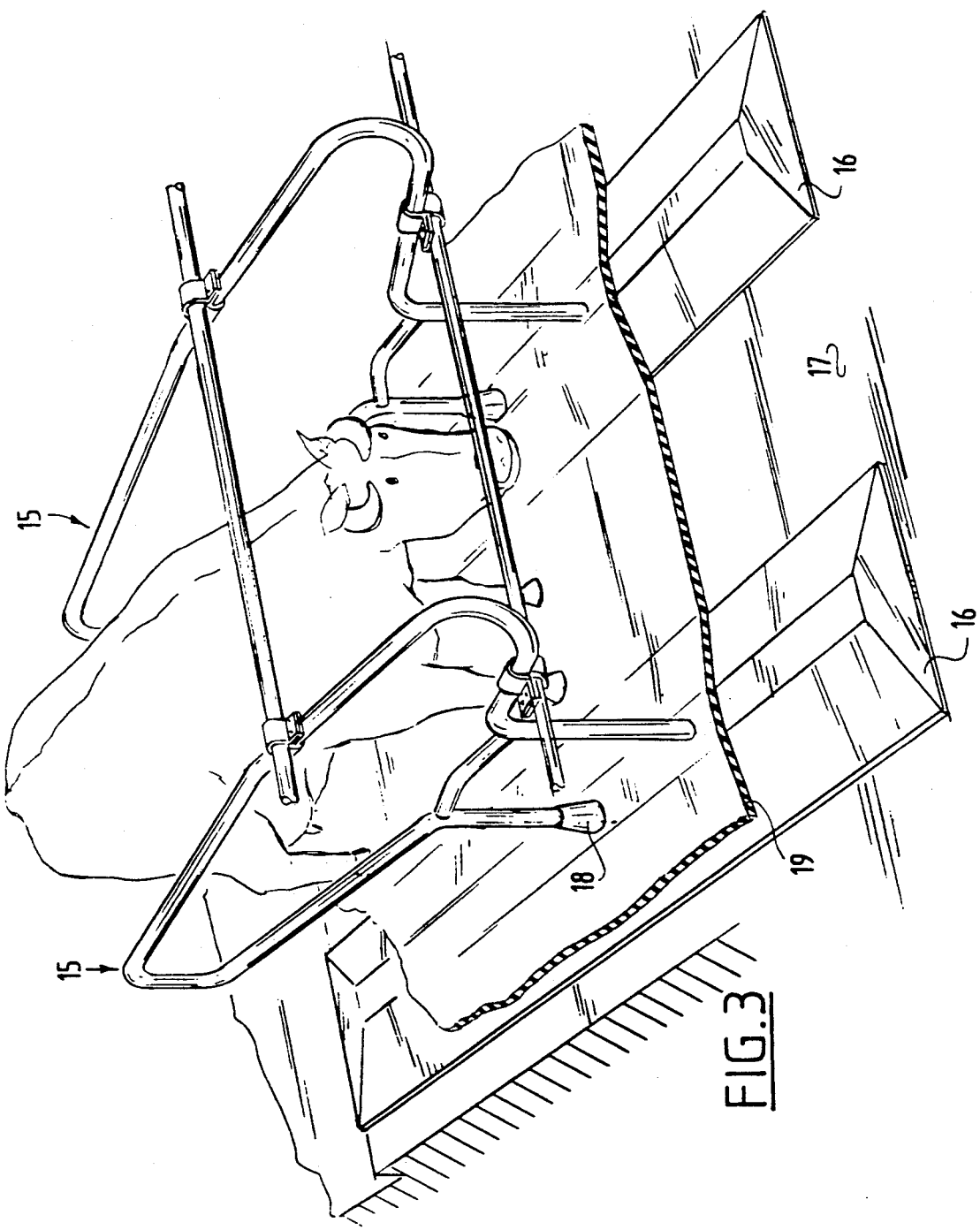

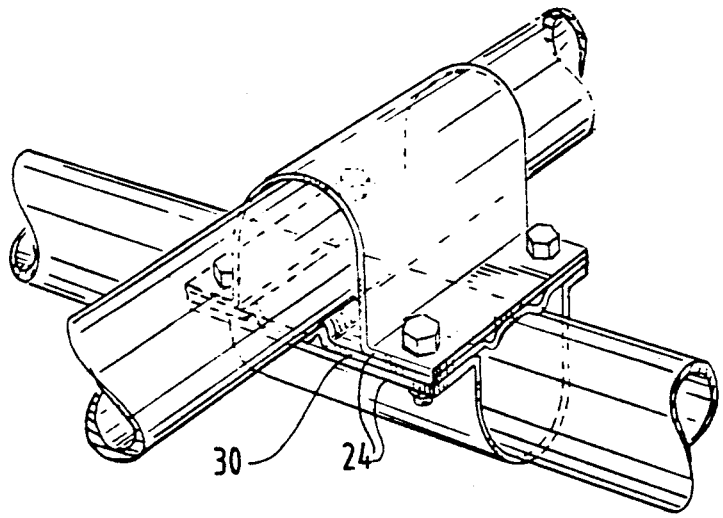
FIG.6
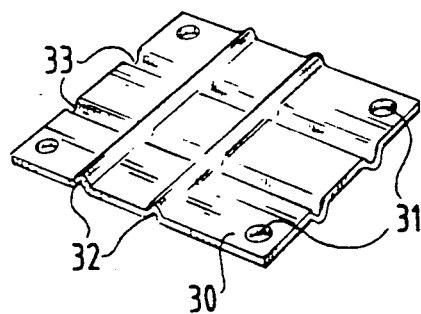
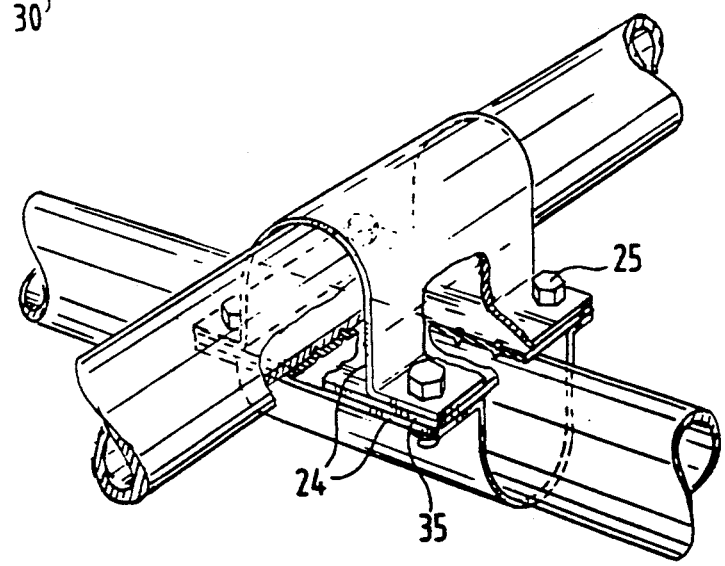
FIG.7
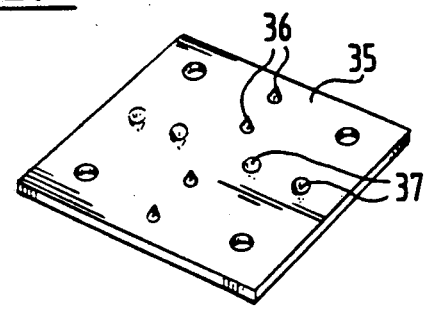

CUBICLE PARTITION

The invention relates to a cubicle partition comprising at least one standing pipe and, connected thereto, a bracket-shaped rail bent from tube material, wherein a mounting plate is fixed to the bottom end of the standing pipe.

Such cubicle partitions are generally known and are used in so-called cubicle stalls to define cubicles or areas where cattle can lie down individually, for instance to ruminate.

There is a clearly discernable trend in dairy cattle farming towards larger dairy cattle. This has the consequence that the cubicles and therefore the cubicle partitions must also become larger. In addition the cubicle partitions must also become stronger because of the heavier loads that can be expected from the larger cattle. In order to give the known cubicle partitions a sufficiently rigid and strong form disproportionately heavy material would therefore have to be used. The costs of the cubicle partitions are thereby in danger of becoming very high.

The invention now has for its object to provide a cubicle partition of the type specified in the preamble which with an efficient use of material has a great strength and rigidity.

With the cubicle partition according to the invention, this object is achieved in that the standing pipe comprises a reinforcing foot which extends divergently downward from a distance above the bottom end. It has been found that when the reinforcing foot is only at a limited height a considerable strengthening of the cubicle partition is achieved.

In a preferred embodiment, the reinforcing foot is a frusto-conical body which extends around the standing pipe and is welded fixedly to the mounting plate. By not fixedly welding the conical body at the top to the standing pipe but causing the connection to be brought about by means of the zinc applied during hot zinc-dipping, a construction is obtained wherein the bending loads on the standing pipe are absorbed equally by both the reinforcing foot and the standing pipe portion enclosed by the reinforcing foot.

A further preferred embodiment of the cubicle partition according to the invention is characterized in that the reinforcing foot comprises an elongated floor portion diverging downward to either side of the cubicle partition. Formed between the elongated floor parts of two adjacently disposed cubicle partitions according to the invention is a shallow trough. This trough is recognized by the cattle an has the result that the cattle will go and lie in the middle of the trough. The cattle hereby no longer lies against the cubicle partition, resulting on the one hand in less load on this cubicle partition and on the other in less chance of damage to the cattle.

A further strengthening of the cubicle partition according to the invention is achieved by providing two standing pipes with the bracket-shaped rail connected to both standing pipes and a cross pipe connecting the top ends of the two standing pipes. An additional advantage of the cross connection is that this prevents the cattle accidentally stepping between the two standing pipes and through the cubicle partition. This could lead to injuries.

The invention also relates to and provides a cubicle stall comprising a number of cubicle partitions according to the invention disposed adjacently at mutual intervals. A cross pipe such as a shoulder bar is therein fitted at least along the top of the cubicle partitions and connected to each thereof by couplings. According to a further embodiment of the invention, each coupling comprises two coupling parts with a U-shaped section with outward flanges and a substantially square top view, wherein arranged in the flanges are screw connection holes lying on the corner parts of a square. The coupling parts are connected by bolts through the flanges. By embodying the couplings in this manner a completely stiff connection of the cross pipe to the cubicle partitions is obtained, which contributes to the stiffness and strength of the assembly.

A further favourable development is a square plate is received between the two coupling parts which is provided with base engaging protrusions.

The invention is further elucidated in the following description with reference to the embodiments shown in the figures.

FIG. 2 is a partly broken away detail view along arrow II in FIG. 1.

FIG. 3 is a perspective view of a part of a cubicle stall with cubicle partitions according to another embodiment of the invention.

FIG. 5-7 show views corresponding with FIG. 4 of alternative embodiments.

Figure 1:
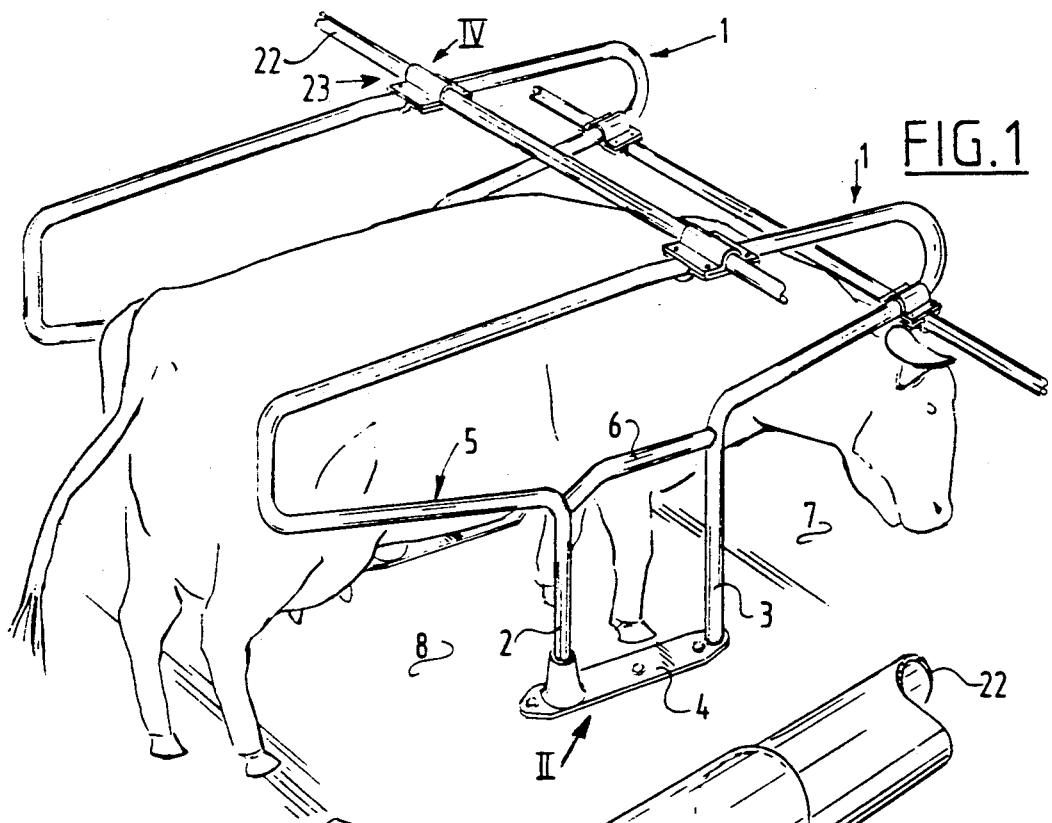
FIG. 1 is a perspective view of a part of a cubicle stall with cubicle partitions according to the invention.

Shown in FIG. 1 are two cubicle partitions 1 which are arranged at an interval adjacent to one another and which define between them a cubicle for a dairy cow.

Each cubicle partition 1 comprises two standing pipes 2, 3 to the bottom end thereof is fixed a mounting plate 4. The cubicle partition 1 is screwed fixedly to the ground using the mounting plate 4. Extending at the top end of the standing pipes 2, 3 is a rail 5 forming one entity therewith. Together with the standing pipes 2, 3 the rail 5 is bent in further per se known manner from tube material.

As FIG. 2 shows in more detail, standing pipe 2 comprises a reinforcing foot 10 which extends diverging downward from a distance above the bottom end. In the embodiment shown the reinforcing foot 10 is a frustro-conical body welded fixedly at its bottom end 13 onto the mounting plate 4. At the location of its upper edge 12 the reinforcing foot 10 is not welded to standing pipe 2. A joint is formed between the upper edge 12 of reinforcing foot 10 and the standing pipe 2 during hot zinc-dipping of the manufactured cubicle partition 1, and the zinc in fact thereby forms a solder connection at this joint. In order to ensure that during zinc-plating the liquid zinc can flow properly into the interior of the reinforcing foot and the interior of the standing pipe 2, a number of holes 14 are bored in the mounting plate 4. Likewise arranged in the reinforcing foot 10 close to the upper edge 12 are a number of holes for zinc.

Owing to the thus embodied strengthening it becomes possible to load standing pipe 2 considerably more, so that given the same material for the standing pipe 2 the cubicle partition 1 can take a larger form and/or have a greater weight.

According to a further development a cross pipe 6 is welded fixedly between the top ends of standing pipes 2, 3. This forms a reinforcement for the cubicle partition 1 and at the same time a passage guard which prevents the cattle from accidentally walking through the cubicle partition 1, and the entailing risk of damage.

As is shown in FIG. 1 and 3, the cubicle partitions 1 are curved with small bend radius. The bend radius of the inner bends lies generally in the order of magnitude of the thickness of the tube material. Thus achieved is that both the head room 7 and the body room 8 are of maximum size and therefore give maximum freedom to the cattle.

The cubicle partitions 15 as shown in FIG. 3 correspond to a significant extent with the partitions 1 of FIG. 1. In these cubicle partitions 15 the reinforcing foot comprises an elongated floor portion 16 diverging downward on either side thereof. In addition to this reinforcing foot an extra reinforcing foot 18 can be used similar to the reinforcing foot 10 of the embodiment of FIG. 1.

Laid in the usual manner over the floor portions 16 of the adjacently arranged cubicle partitions 15 is a rubber stall mat 19. Created in this manner between the floor portions 16 is a lowered portion 17. The cattle will tend to lie down in the middle in such a lowered portion 17 and thus stay clear of the cubicle partitions 15. These are thereby loaded less frequently and less heavily and this is moreover more comfortable for the cattle since the risk of damage is smaller.

Due to the elongated floor portions 16, the cubicle partitions 15 can moreover absorb greater forces. The lower end of the standing pipe is welded to a mounting plate similar to FIGS. 1 and 2, and as shown in FIG. 3, the upper surface of the elongated floor portion surrounds a bottom portion of the standing pipe.

As FIG. 1 and 3 show, a shoulder bar 22 is fitted along the top of the cubicle partitions connected by couplings 23 to each of the rails 5 of the cubicle partitions 1 and 15. The coupling 23 used is shown in more detail in FIG. 4. As can be seen therein, coupling 23 comprises two coupling parts 24 each having a U-shaped section with flanges bent transversely outward. In top view the coupling parts 24 are substantially square. Arranged in the flanges are four screw connection holes. These holes are positioned in accordance with the corner points of a square. It is hereby possible for the two coupling parts 24 to be connected by bolts 25 as shown with the flanges lying against one another turned through 90°. The coupling 23 forms a very stiff connection between the shoulder bar 22 and the rail 5 and thus contributes to the strength of the assembly of cubicle partitions and shoulder bar. As can be seen in the figures, a head bar is furthermore arranged at the front with similar couplings, which has an additional strengthening effect.

Figure 4:
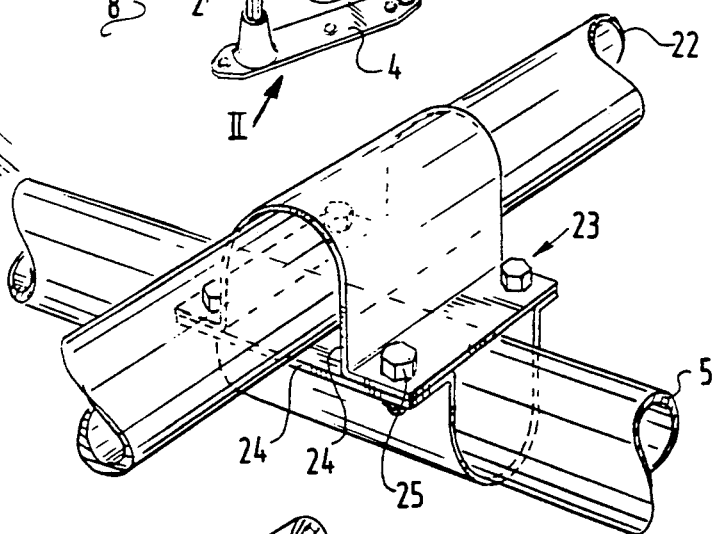
FIG. 4 is a perspective detail view along arrow IV in FIG. 1.
Figure 5:
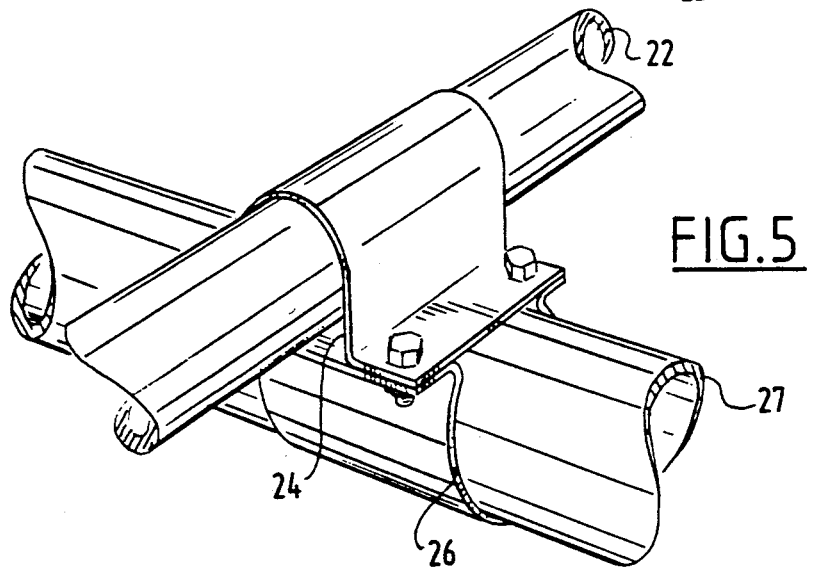

With a coupling of the type such as coupling 23 of FIG. 4 tubes of different diameter can also be mutually connected. Such an embodiment is shown in FIG. 5. The same shoulder bar 22 is here joined to a thicker tube 27. The coupling part 24 extending round the shoulder bar 22 remains unchanged. For the thicker tube 27 a coupling part 26 is used which has a correspondingly larger "U". The holes in the fixing flanges are however arranged at the same mutual position so that the coupling part 24 can be connected thereto in a similar manner. It will be apparent that by providing a limited number of different coupling parts such as 24 and 26 tubes of differing diameters can be rigidly connected to each other in random combinations.

For a still more rigid connection, according to a further development a square plate can be received between two coupling parts. As shown in FIG. 6 this square plate 30 is provided with screw connection holes 31 lying in the same relative positions as the holes in the coupling parts 24. Tube engaging protrusions 32, 33 are formed in plate 30. As shown, these comprise a pair of parallel, upward protruding ribs 32 and a pair of parallel, downward protruding ribs 33. These tube engaging protrusions 32, 33 ensure a better clamping of the tubes relative to each other, whereby they can withstand greater mutual swivel and rotational forces.

FIG. 7 shows an alternative wherein the intermediate plate 35 is made of hardened steel and provided with tube engaging protrusions in the form of sharp points 36 and 37 protruding to both sides. When the bolts 25 are tightened these points 36, 37 grip into the tubes for connecting, whereby they are very well fixed.

The invention is not limited to the embodiments shown in the figures. A so-called freely suspended cubicle partition with one standing pipe at a front end can also be embodied in favourable manner with a reinforcing foot according to the invention, whereby it can withstand heavier loads.

I claim:

1. A partition comprising:
   a standing pipe;
   a bracket-shaped rail of bent tube material connected to an upper end of said standing pipe, said bracket-shaped rail forming an upper portion of said partition;
   a mounting plate mounted on a horizontal support surface and weldedly fixed to a lower end of said standing pipe;
   a reinforcing foot surrounding a bottom portion of the standing pipe, said reinforcing foot comprising an upper end and a lower end, wherein the lower end of said reinforcing foot is weldedly fixed to the mounting plate separate from the connection of the lower end of the standing pipe to the mounting plate, and the upper end of said reinforcing foot is separately connected to said standing pipe, said reinforcing foot extending divergingly downward from its upper end to its lower end.

2. The partition of claim 1, wherein said reinforcing foot has a frusto-conical shape.

3. The partition of claim 2, wherein the upper end of said reinforcing foot is connected to the standing pipe by a zinc solder formed by hot zinc-dipping of the partition.

4. The partition of claim 3, further comprising a second standing pipe, a lower end of said second standing pipe being weldedly connected to the mounting plate, wherein the bracket-shaped rail is connected to upper ends of both of said standing pipes.

5. The partition of claim 4, further comprising a cross bar between the upper ends of both of said standing pipes.

6. A stall comprising a plurality of partitions as claimed in claim 4, said partitions being substantially parallel to each other, wherein a transverse bar extends between said partitions, said transverse bar being connected to the bracket-shaped rails of each of said partitions with a coupling.

7. The stall of claim 6, wherein said coupling comprises:
   a first section composed of a planar surface with a transverse U-shaped portion extending from a central portion of the planar surface for surrounding a portion of said transverse bar, wherein end portions of said planar surface extending from said U-shaped portion form flanges; and a corresponding second section composed of a planar surface with a transverse U-shaped portion extending from a central portion of the planar surface for surrounding a portion of a bracket-shaped rail, wherein end portions of said planar surface extending from said U-shaped portion form flanges for connection to flanges of said first section, wherein the U-shaped portion of said first section extends transversely in a direction perpendicular to the U-shaped portion of said first section.

8. The stall of claim 7, wherein the coupling further comprises a plate for placement between the first and second sections.

9. The stall of claim 8, wherein said plate includes means for engaging and aligning the flanges of said first section and means for engaging and aligning said flanges of the second section.

10. The stall of claim 9, wherein said plate and the flanges of said first section and the flanges of said second section have corresponding holes for receiving a bolt therethrough.

11. A stall comprising a plurality of partitions as claimed in claim 1, said partitions being substantially parallel to each other, wherein a transverse bar extends between said partitions, said transverse bar being connected to the bracket-shaped rails of each of said partitions with a coupling.

12. The stall of claim 11, wherein said coupling comprises:

a first section composed of a planar surface with a transverse U-shaped portion extending from a central portion of the planar surface for surrounding a portion of said transverse bar, wherein end portions of said planar surface extending from said U-shaped portion form flanges; and a corresponding second section composed of a planar surface with a transverse U-shaped portion extending from a central portion of the planar surface for surrounding a portion of a bracket-shaped rail, wherein end portions of said planar surface extending from said U-shaped portion form flanges for connection to flanges of said first section, wherein the U-shaped portion of said first section extends transversely in a direction perpendicular to the U-shaped portion of said first section.

13. The stall of claim 12, wherein the coupling further comprises a plate for placement between the first and second sections.

14. The stall of claim 13, wherein said plate includes means for engaging and aligning the flanges of said first section and means for engaging and aligning said flanges of the second section.

15. The stall of claim 14, wherein said plate and the flanges of said first section and the flanges of said second section have corresponding holes for receiving a bolt therethrough.

16. A stall comprising a plurality of partitions, said partitions being substantially parallel to each other, wherein each of said partitions comprises:

a standing pipe;

a bracket-shaped rail of bent tube material connected to an upper end of said standing pipe, said bracket-shaped rail defining an upper portion of said partition;

a mounting plate mounted on a horizontal support surface and weldedly fixed to a lower end of said standing pipe;

an elongated floor portion extending parallel to and beneath said bracket-shaped rail and defining a lower portion of said partition, said elongated floor portion having a trapezoidal cross-sectional shape and comprising an upper surface which surrounds a bottom portion of the standing pipe, a bottom surface and sides diverging downwardly from its upper surface to its bottom surface, such that two adjacent elongated floor portions and the horizontal support surface therebetween form an open trough, wherein a transverse bar extends between said partitions, said transverse bar being connected to the bracket-shaped rails of each of said partitions with a coupling.

17. The stall of claim 16, wherein said coupling comprises:

a first section composed of a planar surface with a transverse U-shaped portion extending from a central portion of the planar surface for surrounding a portion of said transverse bar, wherein end portions of said planar surface extending from said U-shaped portion form flanges; and a corresponding second section composed of a planar surface with a transverse U-shaped portion extending from a central portion of the planar surface for surrounding a portion of a bracket-shaped rail, wherein end portions of said planar surface extending from 1said U-shaped portion form flanges for connection to flanges of said first section, wherein the U-shaped portion of said first section extends transversely in a direction perpendicular to the U-shaped portion of said first section.

18. The stall of claim 17, wherein the coupling further comprises a plate for placement between the first and second sections.

19. The stall of claim 18, wherein said plate includes means for engaging and aligning the flanges of said first section and means for engaging and aligning said flanges of the second section.

20. The stall of claim 19, wherein said plate and the flanges of said first section and the flanges of said second section have corresponding holes for receiving a bolt therethrough.

* * * * *